United States Patent [19]

Takahashi et al.

[11] Patent Number: 5,210,754
[45] Date of Patent: May 11, 1993

[54] PATTERN SYNCHRONIZING CIRCUIT

[75] Inventors: Toshiro Takahashi, Kumagaya; Takayuki Nakajima, Gyoda; Tetsuo Sotome, Tatebayashi; Noboru Akiyama, Kumagaya, all of Japan

[73] Assignee: Advantest Corporation, Tokyo, Japan

[21] Appl. No.: 710,522

[22] Filed: Jun. 4, 1991

[30] Foreign Application Priority Data

Jun. 6, 1990 [JP] Japan .................. 2-147629

[51] Int. Cl.$^5$ .............................................. H04L 7/08
[52] U.S. Cl. .................. 370/105.4; 375/116; 375/119
[58] Field of Search ............... 370/100.1, 105.4, 106; 375/114, 116, 119; 340/146.2

[56] References Cited

U.S. PATENT DOCUMENTS

| | | | |
|---|---|---|---|
| 3,144,515 | 8/1964 | Kaneko | 370/105.4 |
| 4,802,192 | 1/1989 | Eto et al. | 375/116 |
| 4,984,238 | 1/1991 | Watanabe et al. | 370/105.4 |
| 4,984,249 | 1/1991 | Long et al. | 375/116 |

*Primary Examiner*—Benedict V. Safourek
*Attorney, Agent, or Firm*—Staas & Halsey

[57] ABSTRACT

An Nth one of N parallel sequences of low-speed data demultiplexed by a demultiplexer from high-speed input data in synchronization with a high-speed clock is compared by N comparators with N parallel sequences of reference patterns. The N parallel sequences of reference patterns are each generated in synchronization with a frequency divided clock obtained by frequency dividing the high-speed clock into 1/N. When any of the comparators provides a disagreement output at least once, one clock pulse is eliminated by a post-clock eliminating circuit from the divided clock so that the N sequences of reference patterns are each delayed by one bit. When a counter detects that any one of the comparators does not provide the disagreement signal for n consecutive bits, the sequence of reference patterns corresponding to this comparator and the Nth sequence of low-speed data are in synchronization with each other. Clock pulses of the number corresponding to the line position of the synchronized sequence of reference patterns are eliminated by a pre-clock eliminating circuit from the high-speed clock which is applied to the demultiplexer. By this, line positions of the N parallel sequences of low-speed data are sequentially shifted so that the Nth sequence of low-speed data assumes the same line position as that of the synchronized reference pattern, and as a result, the N parallel sequences of low-speed data are synchronized with the N parallel sequences of reference patterns, respectively.

11 Claims, 6 Drawing Sheets

PATTERN SYNCHRONIZING CIRCUIT

BACKGROUND OF THE INVENTION

The present invention relates to a pattern synchronizing circuit which is used, for example, in measurement of the error rate of a digital signal transmission system, for synchronizing a reference pattern generator with input test data (a pseudo random pattern) prior to the measurement. More particularly, the invention pertains to a demultiplexed pattern synchronizing circuit whereby parallel sequences of input data obtained by demultiplexing a high-speed pseudo random pattern are synchronized with parallel sequences of reference patterns.

In the case of measuring the transmission error rate of a digital signal transmission system, a measurement pattern formed by a repetition of a certain pattern of a predetermined bit length is provided from a pattern generator to the digital transmission system at the transmitting side thereof. At the receiving side of the digital transmission system the same pattern as the measurement pattern at the transmission side is generated as a reference pattern and compared, bit by bit, with an input pattern provided through the transmission system and containing errors, by which the errors in the input pattern are detected, and the number of errors per unit bit is counted. It is customary to use, as the measurement pattern, a pseudo random pattern, usually a repetitive pattern of a maximum length linear shift register sequence of a $(2^n-1)$-bit length. The bit length of a non-repetitive or random maximum length pattern, obtainable with an n-stage shift register, is $2^n-1$, and such a pattern is called a maximum length linear shift register sequence. It is well-known in the art that the pseudo random pattern, which is a repetition of such a pattern, has a feature in that a sequence of bits extracted therefrom every $N=2^a$ (where a is an integer equal to or greater than 1) bit positions starting at an arbitrary bit position constitutes the same pattern as the original pseudo random pattern.

In the case of measuring the error rate of a transmission system when a digital signal is provided thereto at a high speed, it is difficult to implement a high-speed comparator which is able to compare the input pattern with the reference pattern on a bitwise basis at the receiving side. A conventional solution to this problem, which takes advantage of the above-mentioned feature of the maximum length linear shift register sequence (hereinafter referred to as ML sequence), is to divide the input pattern, bit by bit, into $N=2^a$ parallel sequences on N lines. That is, the input pattern is demultiplexed into N parallel sequences of low-speed data at the receiving side. In this instance, if the received pattern is error-free, the $N=2^a$ parallel sequences of low-speed data each form the same pattern as the high-speed pseudo random pattern for measurement use generated at the transmitting side and they are sequentially displaced a fixed number of bits (about 1/N of the pattern period) apart in phase. Accordingly, similar N parallel sequences of low-speed patterns are generated as reference patterns at the receiving side and are respectively compared with the demultiplexed N parallel sequences of low-speed data, by which the error rate of the digital transmission system can be measured. For correct measurement of the error rate, however, it is necessary to establish synchronization between the N demultiplexed parallel sequences of low-speed data and the N parallel sequences of reference patterns so that they are in phase with each other.

Such a demultiplexed pattern synchronizing circuit is disclosed in U.S. Pat. No. 4,878,233. This U.S. patent shows a case where high-speed input data is demultiplexed, by use of a high-speed clock synchronized therewith, into four parallel sequences of low-speed data on four output lines for comparison with four parallel sequences of reference patterns by four comparators. The four parallel sequences of reference patterns are each generated in synchronization with a low-speed clock obtained by frequency dividing the above-said high-speed clock down to ¼. The number of disagreements in the results of comparison by the four comparators is counted. When the count value exceeds a predetermined value, it is decided that the four parallel sequences of low-speed data and the four parallel sequences of reference patterns are not synchronized with each other. Thereafter, upon each counting of a predetermined number of disagreements, one of the low-speed clocks for generating the reference patterns is eliminated, by which the four parallel sequences of reference patterns are all delayed by one bit relative to corresponding four parallel sequences of low-speed data. The one-bit delay of the reference patterns is repeated until the four parallel sequences of reference patterns are synchronized with the four parallel sequences of low-speed data.

With the demultiplexed pattern synchronizing circuit set forth in the above-mentioned U.S. patent, however, no synchronization can be established, in the worst case, until the reference pattern is delayed for a period of time equal to the length of the ML sequence minus one bit, i.e. $(2^n-1)-1$ bit (which is approximately one reference pattern period in practice, because n is selected equal to or greater than 4). In addition, the time length of $2^n-1$ bits in the reference pattern (or low-speed data) is equal to the time length of $4\times(2^n-1)$ bits in the high-speed input data, and this corresponds to approximately four periods of the maximum length linear shift register sequence which is repeated in the high-speed input data. In other words, about four periods of the high-speed pattern for measurement are consumed merely for synchronization, not for measurement of the error rate. The impairs the efficiency of measurement of the error rate. Recently, in particular, a high-speed digital transmission in the gigahertz band for optical communication has come into use. The pattern for measuring the error rate of such a high-speed digital transmission system is required to be large in the bit length of one pattern period.

For example, in the case where the number of bits of one period of the ML sequence of the high-speed pattern data for measurement is $2^{23}-1$, the frequency f is 2 GHz and the number N of parallel sequences of low-speed data is 16, then one period of the reference pattern becomes approximately 67 milliseconds. In the case where the number of bits of one period of the ML sequence is $2^{31}-1$, the frequency f is 2 GHz and the number N is 16, one period of the reference pattern becomes about 17 seconds. Thus, when the bit length of one period of the measurement pattern (high-speed input data) is as large as $2^{31}-1$ ($\simeq 2.15\times 10^9$) bits, the time for synchronization is 17 seconds at maximum and hence is impractical.

SUMMARY OF THE INVENTION

It is therefore an object of the present invention to provide a demultiplexed pattern synchronizing circuit with which it is possible to synchronize a reference pattern with input data in a short time.

According to the present invention, high-speed input data is a demultiplexer by demultiplexer, in synchronization with a high-speed clock, into N parallel sequences of low-speed data on N output lines. N parallel sequences of reference patterns are generated by a pattern generator in synchronization with frequency-divided clocks obtained by frequency dividing the high-speed clock down to 1/N. Then an Nth sequence of low-speed data, composed of data of every Nth bit of the N-bit data which is provided from the demultiplexer upon each occurrence of the divided clock, is compared by N comparators with the N parallel sequences of reference patterns from the reference pattern generator. A control circuit starts to detect disagreements in the comparator outputs. When every one of the N comparators has yielded the disagreement output at least once, the control circuit generates a first clock pulse eliminating signal to eliminate one clock pulse from the divided clock input into the reference pattern generator and is reset to the disagreement detection starting state. When any one of the N parallel sequences of reference patterns agrees with the low-speed data at least n times in succession, a second clock pulse eliminating signal is generated the number of times corresponding to the difference in output line position between the sequence of the matching reference pattern and the above-mentioned Nth sequence of low-speed data to eliminate, by the same number as the second clock pulse eliminating signals, clock pulses of the high-speed clock which is applied to the demultiplexer. By this, the output line position of the Nth parallel sequence of low-speed data in the demultiplexer is shifted to the output line position of the sequence of matching reference patterns.

BRIEF DESCRIPTION OF THE DRAWINGS

FIG. 2A is a diagram for explaining demultiplexing;

FIG. 2B is a diagram for explaining demultiplexing;

DESCRIPTION OF THE PREFERRED EMBODIMENTS

Figure 1:
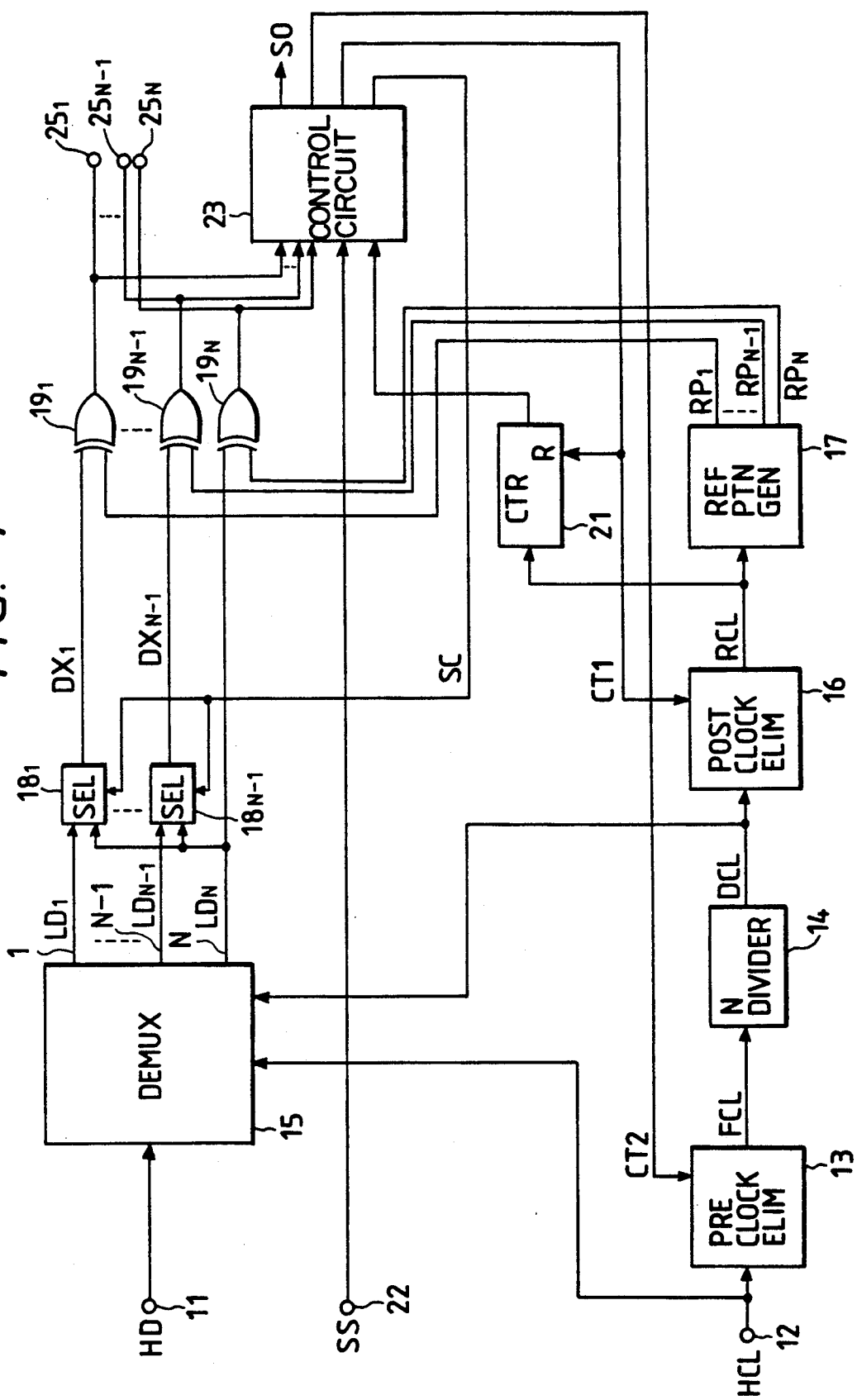
FIG. 1 is a block diagram illustrating an embodiment of the pattern synchronizing circuit according to the present invention.

FIG. 1 is a block diagram of an embodiment of the pattern synchronizing circuit according to the present invention. High-speed data HD, which is a repetition of an ML sequence having a pattern length of $(2^n-1)$ bits, is provided via a digital transmission system (not shown) to a terminal 11 and is demultiplexed by a demultiplexer 15 into N parallel sequences of low-speed data on N output lines 1 to N. In this instance, the N may assume an arbitrary value which is $N=2^a$ (where a is an integer equal to or greater than 1). High-speed clocks HCL are applied to a terminal 12 in synchronization with the high-speed input data HD. The high-speed clock HCL is applied to a pre-clock eliminator 13, which normally outputs it intact but, when supplied with one clock pulse eliminating signal CT2, eliminates one clock pulse as described later on. The output clock FCL from the pre-clock eliminator 13 is divided by a divider 14 down to 1/N. The demultiplexer 15 operates as a serial-parallel converter and repeats operations of fetching the high-speed input data HD of N consecutive bits in synchronization with N clock pulses HCL and outputting them in parallel in synchronization with one divided clock DCL. Thus the high-speed input data HD is converted to N parallel sequences of low-speed data $LD_1$ to $LD_N$ under control of the clock HCL from the terminal 12 and the clock DCL from the divider 14 as referred to above.

Figures 2A, 2B:
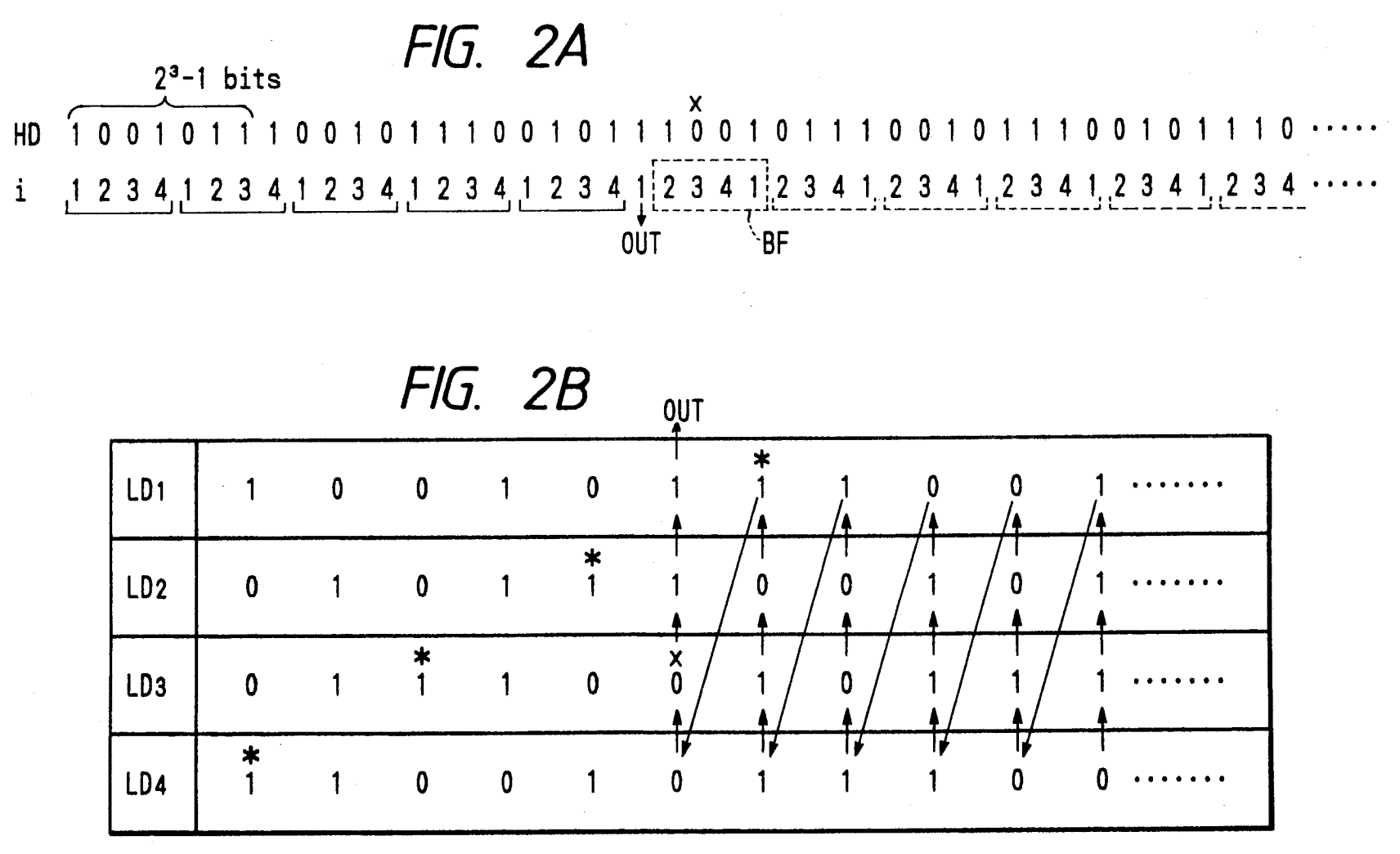

FIG. 2A shows the high-speed input data HD (error-free) which is a repetition of an ML sequence "1001011" of a $(2^3-1)=7$ bit length and the output line number i (i=1, 2,..., N) to which is allocated each bit of the high-speed input data HD when it is demultiplexed to N=four parallel sequences of low-speed data $LD_1$, $LD_2$, $LD_3$ and $LD_4$, and FIG. 2B tabulates the demultiplexed low-speed data $LD_1$ through $LD_4$. In the case where the allocation of the high-speed data bits to the output lines is in the order of i=1, 2, 3, 4 the low-speed data $LD_1$ through $LD_4$ sequentially advance in phase by two bits as indicated by an asterisk * against the leading bit of each arbitrarily selected repetitive 7-bit pattern "1100101" in FIG. 2B. Now, assuming that the high-speed clock HCL is skipped one clock by the pre-clock eliminator 13 at the bit position indicated by a cross x in the high-speed input data HD depicted in FIG. 2A, the output clock DCL from the divider 14 is delayed for a quarter period (corresponding to one bit of the high-speed input data HD). Accordingly the positions of the four consecutive bits, which are demultiplexed, lag one bit as indicated by the broken line frame BF in FIG. 2A. As a result of this, thereafter, the sequences of low-speed data $LD_1$, $LD_2$, $LD_3$ and $LD_4$ on the output lines 1, 2, 3 and 4 shown in FIG. 2B shift to the output lines 4, 1, 2 and 3, respectively, as indicated by the arrows. That is, the sequences of low-speed data on all the output lines shift by one line position upon each elimination of one clock pulse of the high-speed clock HCL which is applied to the demultiplexer 15. The sequences of low-speed data on the output lines i=1, 2, 3, 4 after shifting sequentially advance in phase by two bits as they were before shifting and the sequence of low-speed data on the output line 4 is most advanced in phase. Incidentally, when the allocation of each consecutive four bits of the high-speed input data HD in FIG. 2A to the output lines is in the order of i=4, 3, 2, 1, opposite to the afore-mentioned order, the line positions of the sequences of low-speed data $LD_1$, $LD_2$, $LD_3$ and $LD_4$ shown in FIG. 2B would be on the line positions of i=4, 3, 2 and 1 respectively, and the low-speed data $LD_4$ on the output line 1 would become most advanced in phase. At any rate, the sequence of low-speed data of the most advanced phase is an Nth sequence of low-speed data which is composed of data of every Nth bit contained in each consecutive N-bit data which is demultiplexed by the demultiplexer 15 into N sequences and is output upon each occurrence of the divided clock DCL.

The clocks DCL from the divider 14 are applied to a post-clock eliminator 16, which normally outputs them intact but, when supplied with one clock eliminating signal CT1, eliminates one of the divided clocks DCL. Based on the divided clock RCL from the post-clock eliminator 16, a reference pattern generator 17 generates N parallel sequences of reference patterns $RP_1$ through $RP_N$. The reference patterns $RP_1$ to $RP_N$ sequentially advance in phase by a fixed number of bits and are common in frequency as is the case with the error-free low-speed data $LD_1$ to $LD_N$. (N−1) selectors $18_1$ to $18_{N-1}$ are provided for switching between the low-speed data $LD_N$ of the most advanced phase in the output of the demultiplexer 15 and the other sequences of low-speed data $LD_1$ through $LD_{N-1}$. The (N−1) parallel sequences of low-speed data $DX_1$ to $DX_{N-1}$ which are the outputs from the (N−1) selectors $18_1$ to $18_{N-1}$ and the low-speed data $LD_N$ of the most advanced phase are provided to N comparators $19_1$ to $19_N$ for comparison with the N parallel sequences of reference patterns $RP_1$ to $RP_N$.

A counter 21 counts the number of clocks RCL from the post-clock eliminator 16 and is reset by the clock pulse eliminating signal CT1 as described later on.

A synchronizing operation start signal SS to a terminal 22, the outputs of the comparators $19_1$ to $19_N$, the output of the counter 21, etc., are applied to a control circuit 23. The control circuit 23 outputs a select signal SC and, when predetermined conditions are satisfied, generates the clock pulse eliminating signals CT1 and CT2 and a synchronization completion signal SO. The select signal SC is applied to the selectors $18_1$ through $18_{N-1}$ to cause each of them to select one or the other input thereto, depending on whether the select signal SC is high or low-level. When supplied with the clock pulse eliminating signal CT1, the post-clock eliminator 16 eliminates one clock pulse from the input clock DCL, and the reference patterns $RP_1$ through $RP_N$ respectively lag in phase by one bit. The clock pulse eliminating signal CT1 is applied as a reset signal to the counter 21. When supplied with the second clock pulse eliminating signal CT2, the pre-clock eliminator 13 eliminates one clock pulse from the high-speed clock HCL, and the output clock DCL of the divider 14 is delayed for the 1/N period as mentioned previously; hence, the positions for demultiplexing to the N sequences thereafter shift one by one.

When supplied with the synchronizing operation start signal SS, the control circuit 23 controls, by the select signal SC, the selectors $18_1$ through $18_{N-1}$ to select the low-speed data $LD_N$ of the most advanced phase. Accordingly, the N parallel sequences of reference patterns $RP_1$ through $RP_N$ from the reference pattern generator 17 are all compared with the low-speed data $LD_N$ of the most advanced phase. When supplied with the synchronizing operation start signal SS, the control circuit 23 outputs the first clock pulse eliminating signal CT1 and, at the same time, enters the disagreement detection starting state. After this, whenever a disagreement has been detected by every one of the comparators $19_1$ to $19_N$ at least once, the control circuit 23 produces the clock pulse eliminating signal CT1 and is reset to the disagreement detection starting state. When supplied with the clock pulse eliminating signal CT1 from the control circuit 23, the post-clock eliminator 16 eliminates one clock pulse from the divided clock DCL. Accordingly the phases of generation of the reference patterns $RP_1$ through $RP_N$ by the reference generator 17 are delayed one bit behind the low-speed data $LD_N$. The signal CT1 also resets the counter 21.

When the high-speed input data HD to the terminal 11 is the ML sequence as mentioned previously, each of the N parallel sequences of low-speed data $LD_1$ to $LD_N$ also becomes an ML sequence. These N parallel sequences of low-speed data $LD_1$ to $LD_N$ are sequentially displaced nearly 1/N of the pattern period apart in phase. For example, when the ML sequence "1001011" ($2^3-1$)=7 bits long is demultiplexed to two parallel sequences (N=2), one is ahead of the other in phase by four bits (or the latter is ahead of the former by three bits). When the above-mentioned ML sequence is demultiplexed to four parallel sequences (N=4), the demultiplexed sequences sequentially advance in phase by two bits ($2/7 \approx \frac{1}{4}$). The same is true of the reference pattern generator 17. The N parallel sequences of reference patterns $RP_1$ to $RP_N$ are ML sequences which sequentially advance in phase by approximately 1/N of the pattern period. Accordingly, the low-speed data $LD_N$ of the most advanced phase and the N parallel sequences of reference patterns $RP_1$ to $RP_N$ are compared by the comparators $19_1$ to $19_N$ respectively. Whenever a disagreement is detected by every one of the comparators at least once, delaying the generation of each of the reference patterns $RP_1$ to $RP_N$ by one bit and resetting the control circuit 23 to the disagreement detection starting state are repeated. Any one of the N parallel sequences of reference patterns matches the low-speed data $LD_N$ of the most advanced phase within a period of time nearly equal to 1/N of the reference pattern period at the longest.

This decision of pattern matching is made when the agreement is detected for n consecutive bits, if the number of bits of one period of the reference pattern is $2^n-1$ bits. When the pattern match is detected, the control circuit 23 applies the clock pulse eliminating signal CT2 to the pre-clock eliminator 13 a required number of times. The line position of the sequence of low-speed data which has been of the most advanced phase is moved to the same line position as that of the reference pattern found to match it. In other words, when the i-th sequence of reference pattern on the i-th output line is found to match the low-speed data of the most advanced phase on the N-th output line, (N-i) clock pulses are eliminated by the pre-clock eliminator 13 from the high-speed clock HCL. The N parallel sequences of low-speed data are brought into synchronization with the N parallel sequences the reference patterns. Following this, the selectors $18_1$ to $18_{N-1}$ are controlled to select the low-speed data on the output lines 1 to N−1 corresponding to them, respectively, to count the number of disagreements (i.e., errors) detected by the comparators $19_1$ to $19_N$, by which the error rate of the transmission system is measured.

Figure 3A:
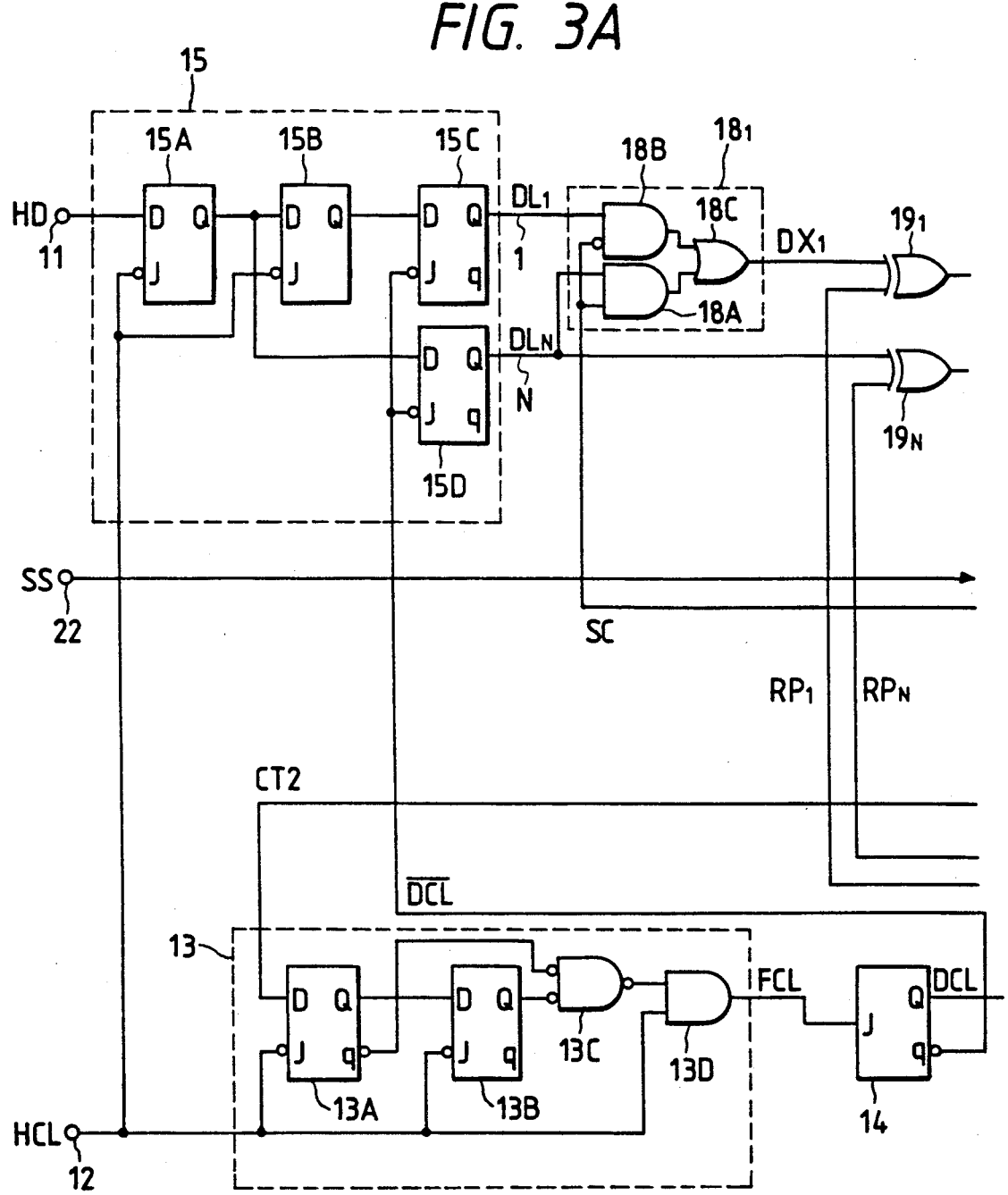
FIG. 3A is a circuit diagram of a portion of FIG. 1.

FIG. 3A is a block diagram of the demultiplexer 15, the pre-clock eliminator 13 and the selector $18_1$ in the case where N=2. The demultiplexer 15 comprises four flip-flops 15A to 15D and it fetches 1-bit data of the high-speed input data HD into the flip-flop 15A in synchronization with one clock pulse of the high-speed clock HCL and fetches the data from the flip-flop 15A into the flip-flop 15B in synchronization with the next clock pulse of the clock HCL and, at the same time, fetches the next bit data of the high-speed input data HD into the flip-flop 15A. The contents of the flip-flops 15A and 15B are fetched by the output clock $\overline{DCL}$ of the divider 14 into the flip-flops 15D and 15C, respectively. By repeating the above-mentioned two-clock HCL operation, the high-speed input data HD is demultiplexed into two parallel sequences of low-speed data $LD_1$ and $LD_N$. The selector $18_1$ comprises gates 18A, 18B and 18C. When the select signal SC is high-level, the gate 18A is enabled and the output $LD_N$ of the flip-flop 15D is selected. When the select signal SC is low-level, the gate 18B is enabled and the output $LD_1$ of the flip-flop 15C is selected.

The pre-clock eliminator 13 comprises a cascade connection of flip-flops 13A and 13B and gates 13C and 13D. Normally, the output of the gate 13C is high-level and the high-speed clock HCL passes through the gate 13D. When the high-level of the clock pulse eliminating signal CT2 is applied to the flip-flop 13A, a high-level input is fetched thereinto by a clock pulse of the high-speed clock HCL, its Q output goes high on the trailing edge of the clock HCL, the high-level Q output is fetched by the next clock pulse of the clock HCL into the flip-flop 13B, and its Q output goes high on the trailing edge of the clock HCL. Consequently, when the high-level of the clock pulse eliminating signal CT2 is read by the first clock HCL into the flip-flop 13A, its q output goes low and, until the Q output of the flipflop 13B goes high on the trailing edge of the second clock HCL. The output of the gate 13C remains low and hence the gate 13D is held disabled and inhibits the passage therethrough of the second clock HCL. The divider 14 is formed by a flip-flop and frequency-divides the output clock FCL from the pre-clock eliminator 13 into one half the frequency. When one clock pulse is eliminated from the output clock FCL, the divided output DCL is delayed for a one-half period. The post-clock eliminator 16 in FIG. 1 is exactly identical in construction to the pre-clock eliminator 13, and hence is not shown.

Figure 3B:
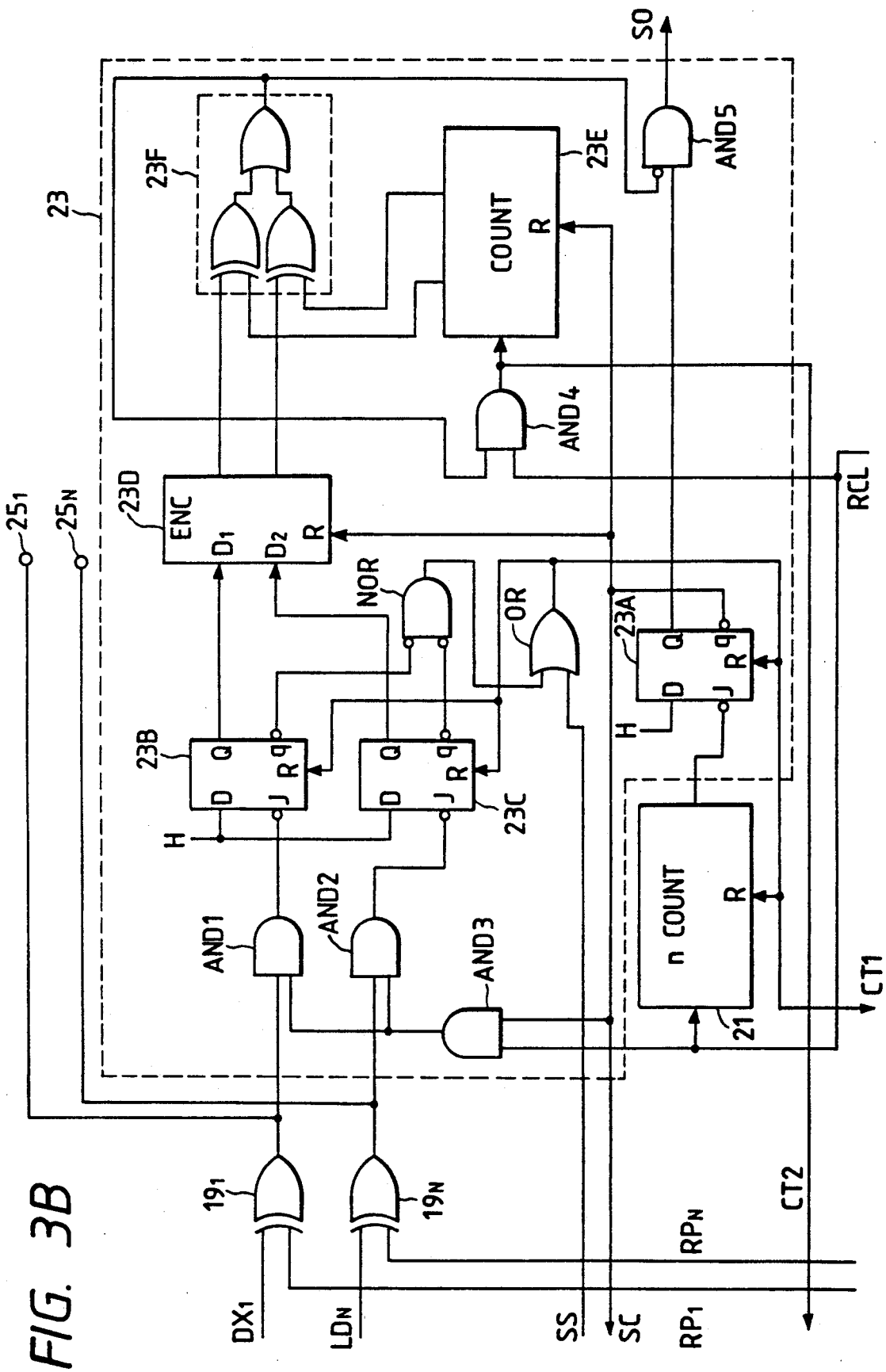
FIG. 3B is a circuit diagram of a control circuit in FIG. 1.

FIG. 3B is a block diagram of a specific example of the control circuit 23 in FIG. 1. The synchronizing operation start signal SS resets flip-flops 23A, 23B and 23C via a gate OR. At the same time, it is output as the clock pulse eliminating signal CT1, which resets the counter 21 which forms a 1/n divider. By this, the control circuit 23 is placed in the disagreement detection starting state. The flip-flop 23A reset by the signal SS outputs, as the select signal SC, its q output having gone high and, at the same time, it enables a gate AND3 and resets an encoder 23D and a counter 23E. Consequently, gates AND1 and AND2 are enabled thereafter upon each occurrence of the clock RCL.

When supplied with a disagreement output (high-level) from the comparator $19_N$ via the gate AND2, the flip-flop 23C is triggered and a high level H provided to its data terminal D is read thereinto, then its q output goes low. Next, when supplied with a disagreement output from the comparator $19_1$, the flip-flop 23B is triggered and a high level is read thereinto and its q output also goes low. As a result of this, the output of a NOR gate goes high and this high-level output is provided as the clock pulse eliminating signal CT1 via the gate OR. At the same time, the high-level output of the gate NOR gate is applied to the flip-flops 23A, 23B and 23C, thus resetting the control circuit 23 to the disagreement detection starting state. The operations described above are also performed when the comparator $19_1$ produces the disagreement output earlier than the comparator $19_N$ and when the both comparators $19_1$ and $19_N$ simultaneously produce the disagreement outputs.

The counter 21 starts counting clock pulses from of the clock RCL at zero each time it is reset. The count value of the counter 21 represents the number of bits for which either one of the comparators $19_1$ and $19_N$ is not continuously providing disagreement outputs (i.e., providing agreement outputs). When the count value reaches n=3 bits, the counter 21 generates a high-level output. In an ML sequence of the $(2^3-1)$ bit length, all sequences of three or more successive bits differ from one another; so that the count value "3" of the counter 21 means establishment of synchronization between one of the reference patterns $RP_1$ and $RP_N$ and the low-speed date $LD_N$ in either one of the comparators $19_1$ and $19_N$. The high-level output of the counter 21 triggers the flip-flop 23A, making its q output low and its Q output high. Accordingly, the gates AND1, AND2 and AND3 are disabled, the select signal SC goes low and a gate AND5 is enabled.

Since one of the flip-flops 23B and 23C, which corresponds to the comparator $19_1$ or $19_N$ providing the agreement output (L-level) for three bits in succession, remains in the reset state, its Q output remains low and the Q output of the other flip-flop remains high (the two reference patterns $RP_1$ and $RP_N$ cannot simultaneously be synchronized with the low-speed data $LD_1$). The Q outputs of the flip-flops 23B and 23C are applied to input terminals $D_1$ and $D_2$ of the encoder 23D and encoded into the number of clock pulse eliminating signals CT2 to be output, depending upon which input terminal is supplied with the high-level Q output. For instance, when the comparator $19_N$ yields the agreement output for three successive bits, it means that the low-speed data $LD_N$ and the reference pattern $RP_N$ have been synchronized with each other. Consequently, the low-speed data $LD_1$ and the reference pattern $RP_1$ also ought to have been synchronized with each other and no clock pulse eliminating signals CT2 need to be output. In other words, the encoder 23D is so designed as to output "00" when the pieces of data which are provided to the input terminals $D_1$ and $D_2$ are "1" and "0", respectively. On the contrary, when the comparator $19_1$ yields the agreement output for three successive bits, it means that the low-speed data $LD_N$ and the reference pattern $RP_1$ have been synchronized with each other. Consequently, the low-speed data $LD_1$ and the reference pattern $RP_N$ are not synchronized with each other. Accordingly, the clock pulse eliminating signal CT2 needs to be generated once to move the line position of low-speed data $LD_N$ to the line position of low-speed data $LD_1$. When the pieces of data to the input terminals $D_1$ and $D_2$ of the encoder 23D are "0" and "1", respectively, the encoder 23D outputs "01". The clock RCL is provided via a gate AND4 to the counter 23E for counting and at the same time it is output as the clock pulse eliminating signal CT2 from the gate AND4. The count value of the counter 23E and the output of the encoder 23D are applied to a match detector 23F. The match detector 23F generates a high-level output when the count value of the counter 23E and the output of the encoder 23D do not match each other and also generates a low-level output when they match each other. Accordingly, in the above example, when one clock pulse RCL passes through the gate AND4 and the count value of the counter 23E goes to "01", the match detector 23F produces a low-level output, by which the gate AND4 is disabled. At the same time, the synchronization completion signal SO is provided from the gate AND5.

Figure 4:
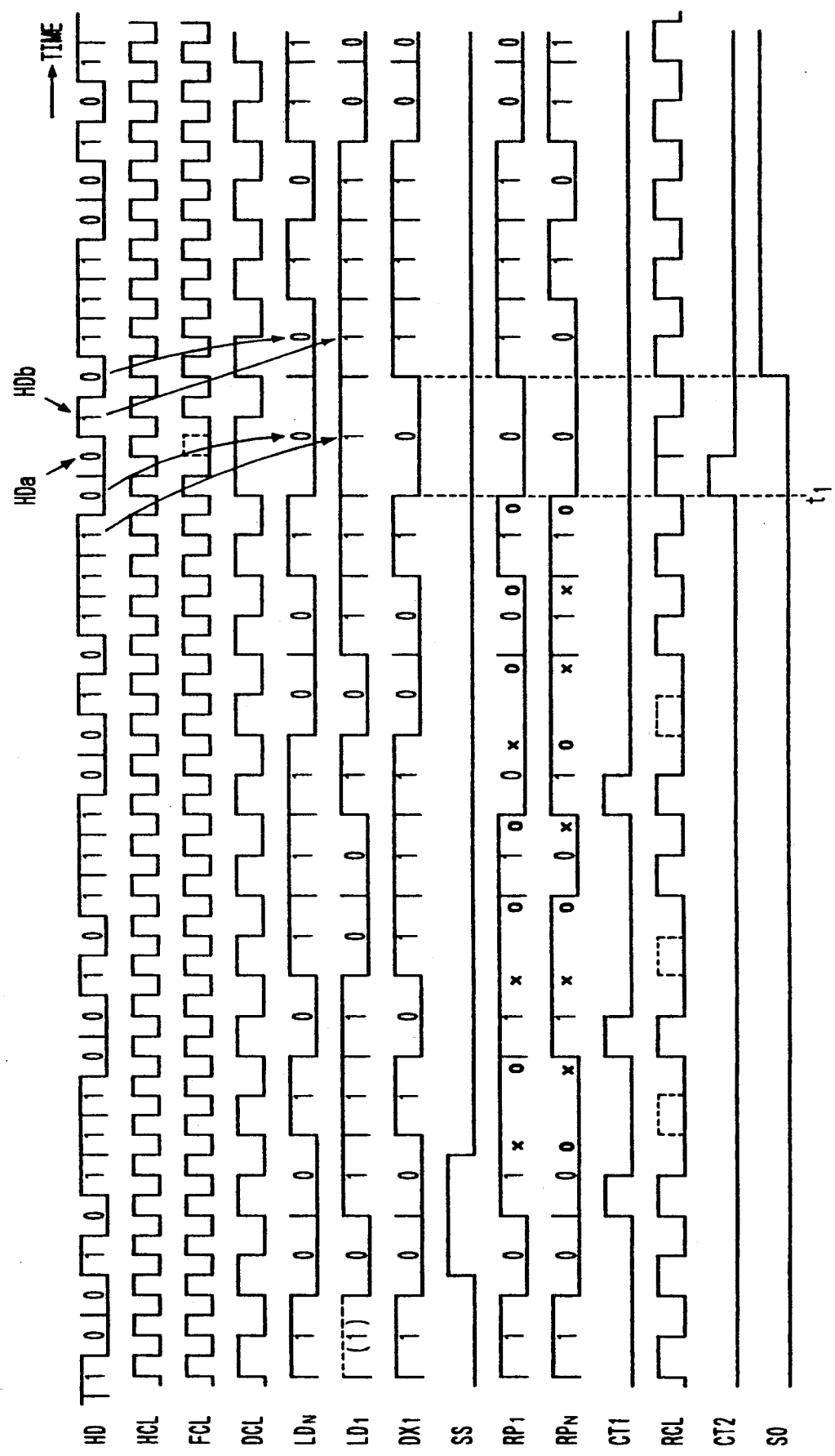
FIG. 4 is a timing chart showing the operation of the pattern synchronizing circuit of FIG. 1 in a case where n=3 and N=2.

FIG. 4 is a timing diagram of the operation of the pattern synchronizing circuit of the present invention in the case where N=2 and one period of the reference pattern is $2^3-1$ (n=3) bits long as in the cases of FIGS. 3A and 3B. When supplied with the synchronizing operation start signal SS from the terminal 22, the control circuit controls the selector $18_1$ by the select signal SC, to set it to select the low-speed data $LD_N$. Consequently, the comparators $19_1$ and $19_N$ are supplied at one input with the low-speed data $LD_N$, which is compared with the reference patterns $RP_1$ and $RP_N$ on a bitwise basis. In FIG. 4 the agreement between them is indicated by a small circle at the right-hand end of the bit of the reference pattern concerned and the mismatch is indicated by a small cross at the right-hand end of the bit of the reference pattern concerned. The control circuit 23 responds to the synchronizing operation start signal SS to output a first shot of the clock pulse eliminating signal CT1 and to reset its internal circuits to the disagreement detection starting state. When either of the comparators $19_1$ and $19_N$ outputs a disagreement signal at least once, the control circuit 23 outputs the clock pulse eliminating signal CT1. One clock pulse of the input clock RCL of the reference pattern generator 17 is eliminated as indicated by the broken line. On this account, the reference patterns $RP_1$ and $RP_N$ are caused to retain the same data for a two-clock time duration. That is, the reference patterns $RP_1$ and $RP_N$ are each delayed in phase by one bit. In the example shown in FIG. 4, the one-bit delay disagreement detection is shown to be repeated twice. Next, when either one of the comparators $19_1$ and $19_N$ obtains an agreement output for three consecutive bits, the count value of the counter 21 goes to "3" at a time point $t_1$. The clock pulse eliminating signal CT2 is provided from the control circuit 23, and immediately thereafter, one clock pulse is eliminated by the pre-clock eliminator 13 from the clock FCL which is supplied to the divider 14, as indicated by the broken line. As a result of this, the clock DCL from the divider 14 and the clock RCL from the post-clock eliminator 16 are each composed of two consecutive pulses. In the example of FIG. 4, the phases of the low-speed data $LD_1$ and $LD_N$ are exchanged so that a bit HDa in the high-speed input data HD to be demultiplexed into the low-speed data $LD_1$ is skipped over and instead the next bit HDb is demultiplexed thereinto as indicated by the arrows. In consequence, the low-speed data $LD_1$ and $LD_N$ and the reference patterns $RP_1$ and $RP_N$ are synchronized with each other, respectively, and the control circuit 23 generates the synchronization completion signal SO, after which the selector $18_1$ is placed in a state to select the low-speed data $LD_1$. The numbers of disagreements in the compared outputs provided to output terminals $25_1$ and $25_N$ of the comparators $19_1$ and $19_N$ are counted by a device (not shown), by which the error rate can be obtained. If comparators for obtaining the error rate are provided separately of the comparators $19_1$ through $19_N$ depicted in FIG. 1, then the selectors $18_1$ through $18_{N-1}$ will be unnecessary and the low-speed data $LD_N$ will be provided directly to the comparators $19_1$ through $19_N$.

Figure 5:
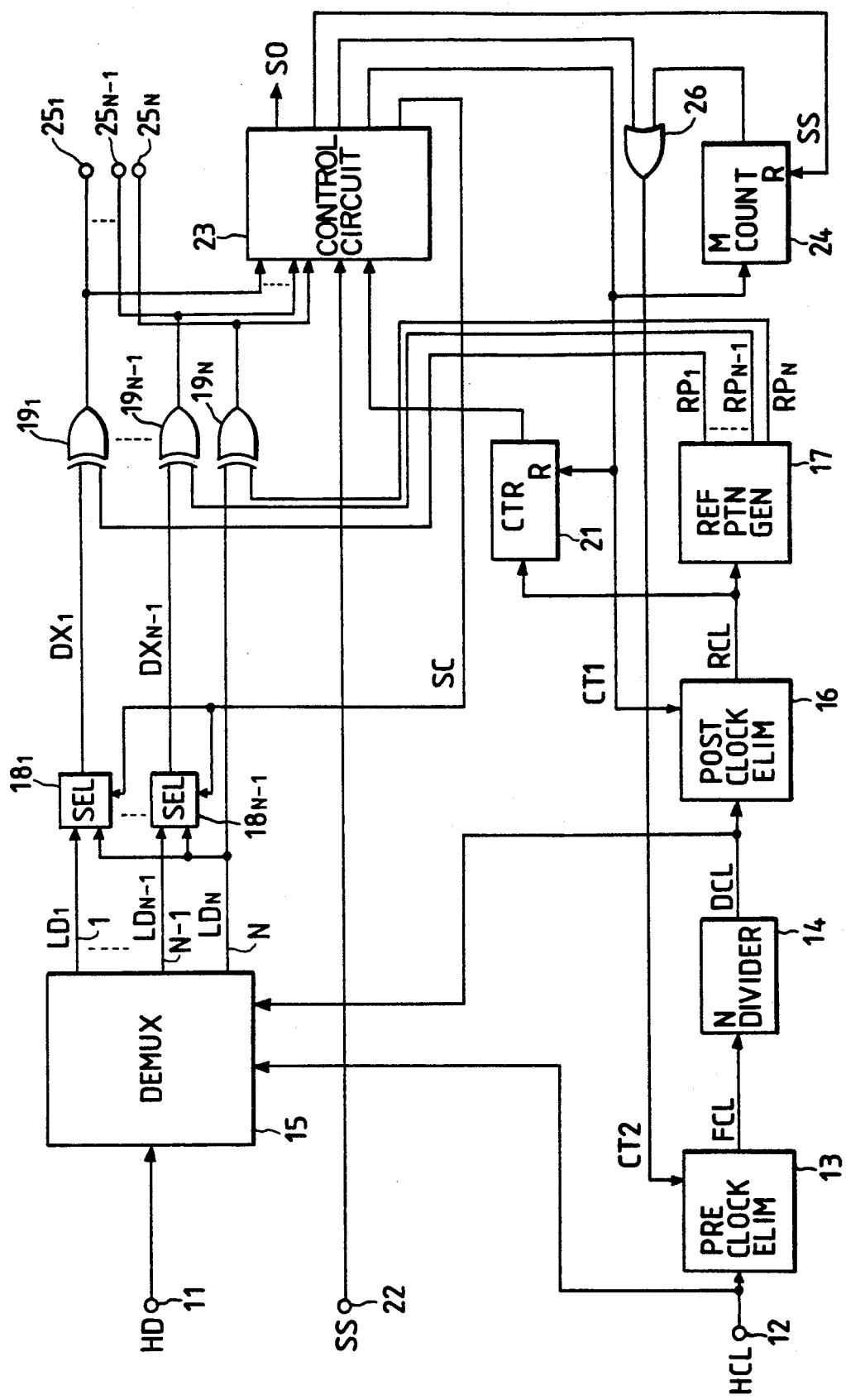
FIG. 5 is a block diagram illustrating another embodiment of the present invention.

The embodiment of the pattern synchronizing circuit of the present invention depicted in FIG. 1 is constructed so that during the synchronizing operation the low-speed data $LD_N$ is compared with each of the reference patterns $RP_1$ through $RP_N$. In the FIG. 4 example of the operation of the pattern synchronizing circuit, assuming that during the synchronizing operation the high-speed input data HD contains errors in a particular period and that errors are unevenly distributed in the low-speed data $LD_N$ from the demultiplexer 15, it is difficult to synchronize the low-speed data $LD_N$ with either one of the reference patterns $RP_1$ and $RP_N$. In general, in the case where during the synchronizing operation the high-speed input data HD contains errors in a particular period and errors are unevenly distributed in that particular low-speed data $LD_1$ through $LD_N$ which is selected by the (N-1) selectors $18_1$ through $18_{N-1}$, it may sometimes be impossible to synchronize the selected one of the low-speed data $LD_1$ through $LD_N$ with the reference patterns $RP_1$ through $RP_N$. FIG. 5 illustrates another embodiment of the present invention which obviates such a defect.

The FIG. 5 embodiment is identical in construction with the FIG. 1 embodiment except for the provision of a counter 24 and an OR gate 26. The counter 24 is reset by the synchronizing operation start signal SS applied to the control circuit 23. It counts the number of clock pulse eliminating signals CT1 which are applied to the post-clock eliminator 16 and generates a high-level output when its count value reaches a predetermined value M. The high-level output is combined by the OR gate 26 with the output of the gate AND4 in FIG. 3B and is applied as the clock pulse eliminating signal CT2 to the pre-clock eliminator 13 via the OR gate 26. The value M to be set in the counter 24 is selected to be the smallest integer greater than $(2^n-1)/N$, for example. In the case where n=3 and N=2, the value M is set to 4. When the value n is large, it does not essentially matter even if the value M is set to an integer either above or below $(2^n-1)/N$, but close thereto.

During the synchronizing operation the low-speed data $LD_N$ is output as low-speed output data $DX_1$ to $DX_{N-1}$ of the selectors $18_1$ to $18_{N-1}$ and it is determined in the comparators $19_1$ to $19_N$ whether or not the low-speed data $LD_N$ matches the reference patterns $RP_1$ to $RP_N$, respectively. In the case where the high-speed input data HD contains errors in a particular period and errors are unevenly distributed in the low-speed data $LD_N$, state of the clock pulse eliminating signal CT1 is generated at least once in any n consecutive bit. In this instance, no synchronization can be established as long as the errors are unevenly distributed.

The counter 24 counts the number of pulses of the clock pulse eliminating signal CT1. When its count value goes to M, the control circuit 23 generates the clock pulse eliminating signal CT2. Immediately thereafter one clock pulse is eliminated by the pre-clock eliminator 13 from the clock FCL which is applied to the divider 14, by which the line positions of low-speed data $LD_1$ to $LD_N$ are sequentially shifted by one line position in the demultiplexer 15. As a result of this, errors are unevenly distributed in the sequence of low-speed data $LD_{N-1}$ and errors are unevenly distributed in the low-speed data $LD_N$ of the most advanced phase after the line position shift selected by the selectors $18_1$ to $18_{N-1}$. This ensures synchronization of the low-speed data $LD_1$ to $LD_N$ and the reference patterns $RP_1$ to $RP_N$ by the synchronizing operation as is the case with the FIG. 1 embodiment.

As described above, according to the present invention, one of the N demultiplexed sequences of low-speed data which has the most advanced phase is compared with each of N parallel sequences of reference patterns and is synchronized with that one of the reference patterns whose phase is the closest thereto. Line positions of the N parallel sequences of low-speed data are cyclically shifted in one direction so that the line position of the sequence of low-speed data of the most advanced phase is moved to the line position of the sequence of reference patterns having the closest phase. Hence, synchronization can be established within a time 1/N of the reference pattern period in the worst case.

It will be apparent that many modifications and variations may be effected without departing from the scope of the novel concepts of the present invention.

What is claimed is:

1. A pattern synchronizing circuit comprising:
   pre-clock eliminating means for eliminating one clock pulse from a high-speed clock input thereto upon each application thereto of a pre-clock pulse eliminating signal;
   clock dividing means for frequency dividing the high-speed clock output from said pre-clock eliminating means to 1/N;
   demultiplexing means for sequentially demultiplexing consecutive bits of high-speed input data into N parallel low-speed sequences on N output lines in synchronization with said high-speed clock and said N sequences of low-speed data are output in synchronization with said frequency divided clock, N being an integer equal to or greater than 2;
   post-clock pulse eliminating means, supplied with said frequency divided clock, for eliminating one pulse from said frequency divided clock upon each application thereto of a post-clock pulse eliminating signal and outputting an output clock;
   reference pattern generating means for generating N parallel sequences of reference patterns, sequentially displaced apart in phase, in synchronization with the output clock of said post-clock pulse eliminating means;
   N comparators, whereby an Nth sequence of low-speed data, composed of data of every Nth bit of N-bit data being sequentially demultiplexed by said demultiplexing means into N parallel sequences and output upon each occurrence of said frequency divided clock is compared with said N parallel sequences of reference patterns, each of said N comparators outputting an agreement or disagreement signal;
   asynchronism detecting means for generating said post-clock pulse eliminating signal upon detecting that each of said N comparators has output said disagreement signal; and
   synchronization setting means for detecting one of said N parallel sequences of reference patterns with which an Nth sequence of low-speed data is synchronized and for generating said pre-clock pulse eliminating signals of a number corresponding to a line position of said sequence of reference patterns synchronized with said Nth sequence of low-speed data, whereby line positions of said N parallel sequences of low-speed data are sequentially shifted by said corresponding number in said demultiplexing means so that said Nth sequence of low-speed data assumes the same line position as that of said synchronized reference pattern.

2. A pattern synchronizing circuit according to claim 1, wherein said synchronizing detecting means includes:
   N hold means for holding predetermined logical states in response to disagreement signals from said N comparators; and
   post-clock pulse eliminating signal generating means for generating said post-clock pulse eliminating signal and for resetting said N hold means when all of said N hold means enter said predetermined logical states.

3. A pattern synchronizing circuit according to claim 2, further comprising counter means for counting the number of said post-clock pulse eliminating signals and for applying said pre-clock pulse eliminating signals to said pre-clock eliminating means once when the count value of said counter means reaches a predetermined number.

4. A pattern synchronizing circuit according to claim 2, further comprising N−1 select means for selecting said Nth sequence of low-speed data and the other N−1 sequences of low-speed data, and wherein said Nth sequence of low-speed data and output data of said N−1 select means are provided to said N comparators and during a synchronizing operation each of said N−1 selects means selects and outputs said Nth sequence of low-speed data to a corresponding one of said N−1 comparators whereby N sequences, each identical to said Nth sequence of low-speed data, are compared by said N comparators with said N parallel sequences of reference patterns.

5. A pattern synchronizing circuit according to claim 1, wherein said synchronizing setting means includes:
   synchronization detecting means, reset upon each application of said post-clock pulse eliminating signal, for counting the number of output clock pulses of said post-clock eliminating means and outputting a synchronization detecting signal when the count value reaches a predetermined value; and
   pre-clock pulse eliminating signal generating means for responding to said synchronization detecting signal to output, as said pre-clock pulse eliminating signal said output clock pulses of said post-clock eliminating means by said corresponding number.

6. A pattern synchronizing circuit according to claim 5, wherein each of said reference patterns is a maximum length linear shift register sequence of a $(2^n-1)$bit length and said predetermined value is equal to or greater than n, n being a positive integer.

7. A pattern synchronizing circuit according to claim 5, further comprising counter means for counting the number of said post-clock pulse eliminating signals and for applying said pre-clock pulse eliminating signals to said pre-clock eliminating means once when the count value of said counter means reaches a predetermined number.

8. A pattern synchronizing circuit according to claim 5, further comprising N−1 select means for selecting said Nth sequence of low-speed data and the outer N−1 sequences of low-speed data, and wherein said Nth sequence of low-speed data and output data of said N−1 select means are provided to said N comparators and during a synchronizing operation each of said N−1 select means selects and outputs said Nth sequence of low-speed data to a corresponding one of said N−1 comparators whereby N sequences, each identical to said Nth sequence of low-speed data, are compared by said N comparators with said N parallel sequences of reference patterns.

9. A pattern synchronizing circuit according to claim 1, further comprising counter means for counting the number of said post-clock pulse eliminating signals and for applying said pre-clock pulse eliminating signal to said pre-clock eliminating means once when the count value of said counter means reaches a predetermined number.

10. A pattern synchronizing circuit according to claim 9, wherein each of said reference patterns is a maximum length linear shift register sequence of a $(2^n-1)$ bit length and said predetermined number is an integer approximately equal to $(2^n-1)/N$, n being a positive integer.

11. A pattern synchronizing circuit according to claim 1, further comprising N−1 select means for selecting said Nth sequence of low-speed data and the other N−1 sequences of low-speed data, and wherein said Nth sequence of low-speed data and output data of said N−1 select means are provided to said N comparators and during a synchronizing operation each of said N−1 select means selects and outputs said Nth sequence of low-speed data to a corresponding one of said N−1 comparators whereby N sequences, each identical to said Nth sequence of low-speed data, are compared by said N comparators with said N parallel sequences of reference patterns.

* * * * *

UNITED STATES PATENT AND TRADEMARK OFFICE
CERTIFICATE OF CORRECTION

PATENT NO. : 5,210,754

DATED : MAY 11, 1993

INVENTOR(S) : TOSHIRO TAKAHASHI ET AL.

It is certified that error appears in the above-indentified patent and that said Letters Patent is hereby corrected as shown below:

Col. 2, line 47, "The impairs" should be --This impairs--.

Col. 3, line 8, "is a demultiplexer by demultiplexer," should be --is demultiplexed by a demultiplexer--.

Col. 5, line 64, "DCL:" should be --DCL.--.

Col. 7, line 59, "gate NOR" should be --NOR gate--;
line 66, "of" should be deleted.

Col. 10, line 40, "state of" should be deleted.

Col. 11, line 62, "synchronizing" should be --asynchronism--.

UNITED STATES PATENT AND TRADEMARK OFFICE
CERTIFICATE OF CORRECTION

PATENT NO. : 5,210,754
DATED : MAY 11, 1993
INVENTOR(S) : TOSHIRO TAKAHASHI ET AL.

It is certified that error appears in the above-indentified patent and that said Letters Patent is hereby corrected as shown below:

Col. 12, line 17, "selects" (first occurrence) should be --select--;
line 25, "synchronizing" should be --synchronization--;
line 35, "signal" should be --signal,--;
line 51, "outer" should be --other--.

Col. 13, line 8, "1," should be --2,--.

Signed and Sealed this

Twenty-ninth Day of March, 1994

Attest:

BRUCE LEHMAN

*Attesting Officer*   *Commissioner of Patents and Trademarks*